July 26, 1949.　　　　J. M. TYLER ET AL　　　　2,477,501
ENGINE SUSPENSION MEANS

Filed Feb. 24, 1945　　　　　　　　　　　　　2 Sheets-Sheet 1

INVENTOR
John M. Tyler and
Andrew V.D. Willgoos
BY
H. Hume Mathews
AGENT.

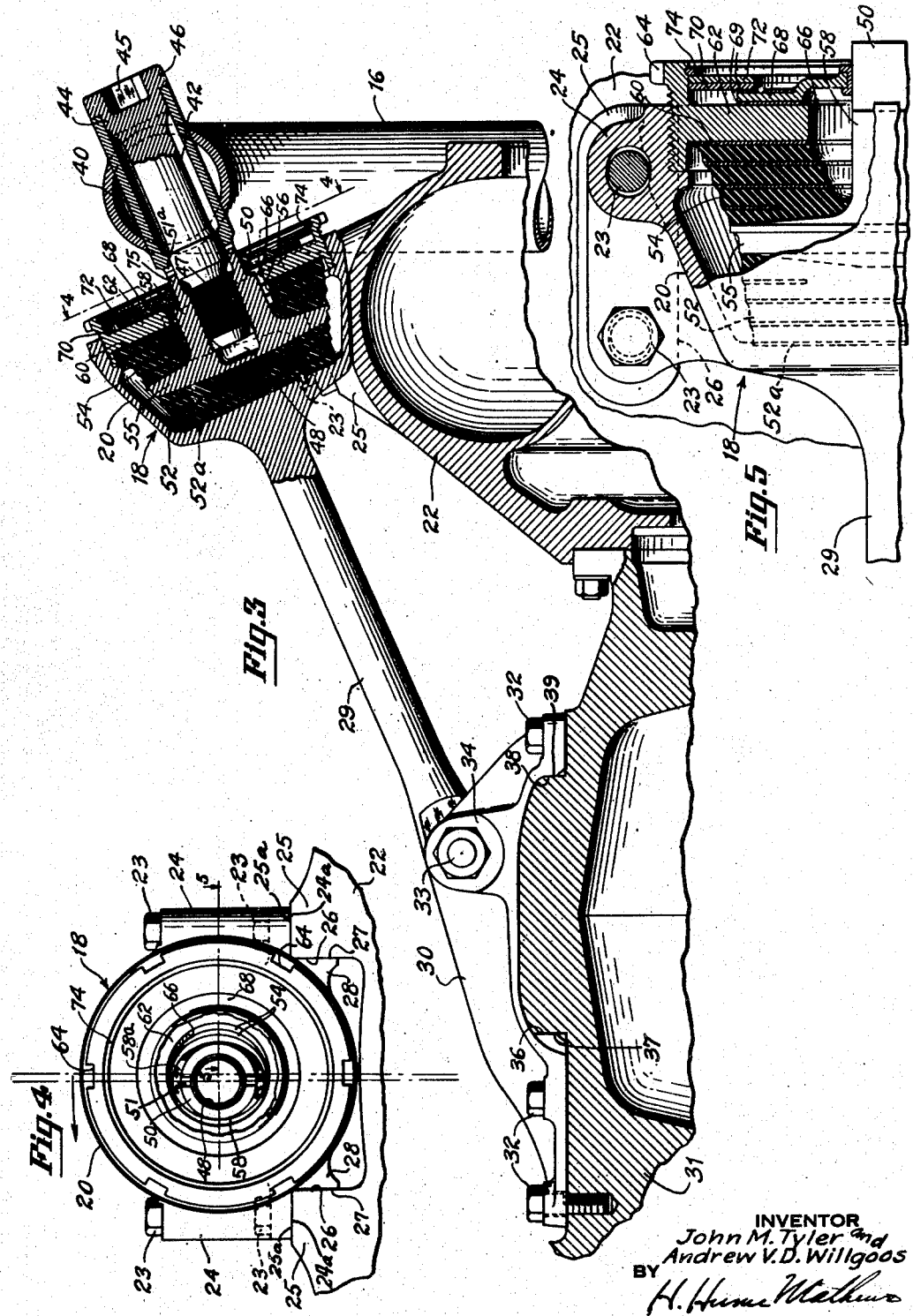

Patented July 26, 1949

2,477,501

UNITED STATES PATENT OFFICE 2,477,501

ENGINE SUSPENSION MEANS

John Moreland Tyler and Andrew V. D. Willgoos, West Hartford, Conn., assignors to United Aircraft Corporation, East Hartford, Conn., a corporation of Delaware Application February 24, 1945, Serial No. 579,542

12 Claims. (Cl. 248—5)

This invention relates to improvements in engine suspension means and has particular reference to improved resilient engine mounts of the pedestal type for resiliently connecting an aircraft engine to the aircraft.

An object of the invention is to provide improved means for flexibly mounting an aircraft engine on an aircraft carried engine support, and more particularly to provide a flexible bracket of the pedestal type which has a rigid connection to the engine adjacent the support for transmitting radial and torsional loads from the engine to the support, and a pivotal connection to the engine more remote from said support for transmitting the major loads from the engine to the support as tension and compression loads along the major axis of the bracket.

A further object of the invention is to provide a compound pedestal bracket of this type including a flexible pedestal carried by the engine support and having cushions of resilient material, and a housing for said pedestal carried by the engine.

A further object of the invention is to provide a pedestal type engine mount having cooperating means carried by the engine and the engine support for permitting a predetermined relative movement therebetween as a result of engine torque and permitting a lesser movement therebetween as a result of radially directed forces.

Another object of the invention is to provide improved engine suspension means of this type enabling removal of an engine mount unit from the installation without removing the engine from the airplane or disturbing its control connections thereto.

A further object of the invention is to provide an improved suspension system particularly adapted to support an engine from a single mount ring by the engine crankcase and blower case.

A further object of the invention is to provide an improved frictional damping construction for flexible engine mount units in which the damper spring deflection is independent of the tension-compression loading of the flexible core.

Another object of the invention is generally to improve the construction and performance of aircraft engine mounts.

Other objects and advantages of the invention will be more particularly pointed out hereinafter or will become apparent from the following description of one embodiment of the invention shown in the accompanying drawings.

In the drawings:

Fig. 3 is an enlarged longitudinal sectional view through one of the engine mount units;

Fig. 4 is a view on line 4—4 of Fig. 3 with the attaching stud removed; and

Fig. 5 is an enlarged sectional view on line 5—5 of Fig. 4.

Figure 1:
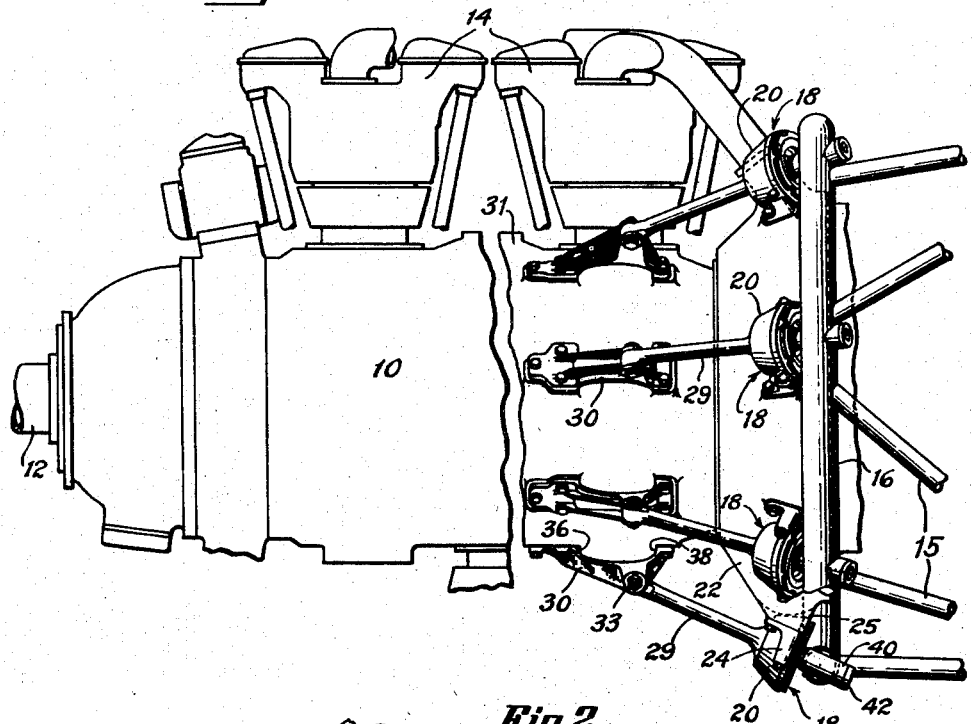
Fig. 1 is a side elevation of a radial aircraft engine mounted in accordance with the invention, parts of the engine being broken away to facilitate illustration.

As herein shown, an engine 10 having a crankshaft 12 and radial cylinders 14 is secured to the aircraft on suitable supporting structure including a frame formed of inter-braced struts 15 and the usual mount ring 16 by a plurality of pedestal type resilient mount units, or brackets, 18 arranged in peripherally spaced relation about the engine and mount ring. The engine 10 may be the engine shown and described in detail in the Hobbs-Willgoos application, Serial No. 552,372, now Patent No. 2,426,879, assigned to applicants' assignee in which the cylinders 14 are arranged in seven longitudinal banks.

Figure 2:
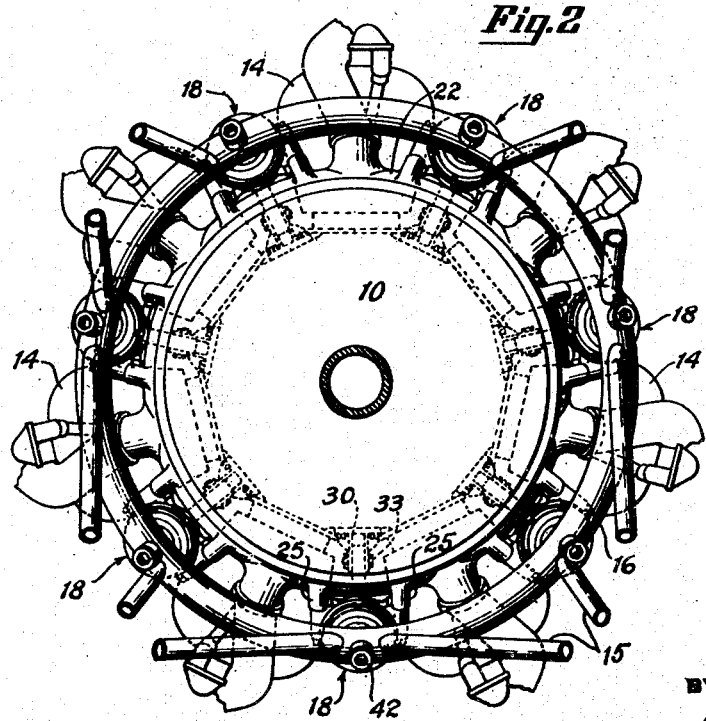
Fig. 2 is an end view from the right-hand end of Fig. 1.

The several engine mount units which are located between adjacent banks of cylinders, as shown in Fig. 2, are identical in construction and consequently a description of one will suffice. Each mount unit includes a flexible core housing 20 rigidly attached to the engine blower casing 22 by four cap screws 23, two of which are shown in Fig. 4. These cap screws, which are arranged in pairs fore and aft and on opposite sides of the housing 20, as shown in Fig. 5, extend through bosses 24 on opposite sides of the housing 20, and are screw threaded into peripherally spaced pads 25 provided on the blower housing for each engine mount unit. The holes in bosses 24 through which cap screws 23 extend are elongated in a fore and aft direction, as shown in Fig. 5, for reasons which will presently appear.

As shown most clearly in Fig. 4, the pads 25 on the blower casing have confronting faces, or lands, 26 extending fore and aft of the engine and between which corresponding faces 27 of lugs 28 on housing 20 are closely received, so that torsional loads are transmitted from the engine blower case 22 to housing 20 through these lugs rather than through the cap screws. Pads 25 also have faces 25a which are in contact with faces 24a on bosses 24. Radial loads are transmitted from the engine pads 25 directly to bosses 24 on housing 20 through these faces. These abutting faces of the pads 25 and the bosses 24 also extend fore and aft in a plane normal to the faces 26.

The housing 20 has integral therewith a rigid, forwardly extending strut, or stem, 29 aligned with the longitudinal axis of the housing which has a pivotal connection at its free end to an attaching shoe 30 secured to the engine crankcase 31 by cap screws 32. The two points of attachment of the bracket to the engine are such that the longitudinal, or major, axis of the bracket is so inclined with respect to the axis of rotation of the engine that the axes of the several brackets intersect at a common point on the engine axis. The pivotal connection of the strut 29 to the shoe 30 is provided by a bolt 33 which extends through a pair of upstanding spaced ears 34 on the shoe and through the end of strut 29. Loading faces 36 and 38 are provided on the shoe 30 for cooperation with faces 37 and 39 of the crankcase 31. Faces 36 and 38 are formed in parallel planes normal to the engine axis and normal to the faces 26. Close tolerances are maintained between the faces 36, 38 and 37, 39, respectively, so that there will be no fore and aft movement of the shoe with respect to the crankcase as the fore and aft loads vary, and consequently the cap screws 32 will not be placed in shear.

The flexible core housing 20 forms a generally cup-shaped chamber having its open mouth adjacent the ring and in which the flexible pedestal of the mount unit is received in substantially axial alignment with the housing.

The ring 16 is provided at each engine mount unit location with a stud receiving sleeve 40 which extends through the cross-section of the ring and is permanently welded thereto, this sleeve being axially aligned with the strut 29 and housing 20 of the bracket in position to receive a pedestal stud 42. Stud 42 has a head 44 provided with a non-circular turning recess 45 and a flange 46 overlying the outer end of the sleeve 40 and terminates in an inner end 47 which is screw-threaded into an axial passage 48 in a mushroom-shaped core 50 of the resilient pedestal element, suitable enlargements being provided on the head and on the shank of the stud to center the stud in the sleeve 40.

The abutting ends of the core 50 and the sleeve 40 are provided with interlocking means for preventing rotation of the core during turning of the stud 42. Herein this interlocking means comprises a diametrical slot 51 in the end of the core and corresponding tongues 51a on the end of the sleeve 40. It will be noted that the slot 51 lies in a plane at right angles to the axis of pivot 33 so that the bracket can swing free from the sleeve 40 about pivot 33 when stud 42 has been removed from core 50.

Core 50, which is located within the chamber of the housing 20, has the usual generally flat, circular rubber pads 52 and 54 bonded to opposite sides of the head 55 thereof which are provided with parallel metal inserts for increasing their stiffness in compression in a usual manner. Pad 52 has an outer metal plate 52a bonded thereto which is received in a recess in the bottom of the chamber for positioning the pad against lateral displacement therein. Pad 54, which is bonded to the other side of the head 55, is provided with an annular passage 56 therein through which the axial stem 58 of the core passes with sufficient clearance to permit movement of the pad relative to the core. As shown in Fig. 4, the passage 56, in the no-torque position of the parts, is somewhat eccentrically located relative to the stem 58 in the line of the periphery of the ring to allow for the torque wind-up of the engine in the direction of the arrow in Fig. 4, in the usual manner.

Pad 54 has a metal plate 60 bonded to its outer face which is received in a recess in a cover plate 62 screw-threaded into the mouth of the housing 20, suitable spanner engaging notches 64 being provided for rotating the cover to provide initial compression of the pads as desired. The cover 62 also has an enlarged passage 66 in the vicinity of stem 58 for permitting the cover to move laterally relative to the stem as torsional loads are applied to the housing 20 from the blower casing attachment.

It will be noted (Fig. 4) that the portion 58a of stem 58 which extends through the cover aperture 66 is elliptical in cross-section, and that the major axis of the elliptical portion is located radially of the mount ring so that only a small movement is permitted between the stem and the wall of cover passage 66 under radial forces whereas a greater movement is permitted under torsional forces.

Improved frictional damping means are associated with each bracket, acting in parallel with the shear action of the resilient pads 52 and 54, for damping movements of the engine. This means comprises a plate member 68 having friction material 69 on opposite faces thereof in position to engage both the outer surface of the cover 62 and a plate 70 located alongside the friction material remote from the cover. A spring 72, herein shown as a Belleville spring stressed into a flattened condition, constantly urges the parts into frictional engagement and is held in place in the housing by a locking ring 74. The plate 68 which carries the friction material is piloted on an elongated, reduced stem portion 75 of stem 58 and is free to move axially therealong as axial loads are imposed on the pads.

It will be noted that as a result of having the pedestal stud 42 inserted through the mount ring and in the longitudinal axis of the bracket, all major loads are applied to the mount ring through the centerline of the mount ring cross-section so that no torsional load is applied to the ring about its cross-sectional periphery.

As a result of the above described construction it is made possible to support an engine from a single mount ring by two attachments along the rotational axis of the engine, one to the blower casing and the other to the crankcase at a point spaced forward of the blower casing. Also by this construction fore and aft loads are carried from the engine to the shoe 30 through vertical lands 36 and 38, through the pin joint 33, strut 29, pedestal elements 52, 54 and stud 42 to the ring 16 and the airplane structure. It will be noted that these forces are transmitted in a straight line so as to eliminate all bending moments, and due to the holes or slots in bosses 24 through which cap screws 23 extend (see Fig. 5), these loads are not transmitted to the blower casing 22 and it is not necessary to maintain close tolerances between either land 36 or 38 and the holes in the blower casing which receive the cap screws 23. It will be evident that radial forces are transmitted directly from pads 25 on the blower case to bosses 24 on the housing 20, while torsional forces are transmitted from fore and aft faces 27 on these pads to corresponding faces 26 on lugs 28 of the housing 20.

It will also be evident that with the damper spring 72 supported on the housing 20 so that this spring is fixed relative to the housing and with the friction material slidable relative to the pedestal stem portion 15, there will be no variation in the spring pressure applied to the damping means under tension-compression loading of the bracket.

The construction above described also permits the removal of a defective engine mount unit from the installation without removing the engine from the airplane. This is accomplished simply by removing the stud 42, removing the pivot bolt 33, removing the cap screws 23 which attach the housing to the blower casing, and finally removing the bracket from the engine.

The shoe 30 can be then detached if desired by removing cap screws 32 which permits complete removal of the defective engine mount unit.

While only one embodiment of the invention has been shown and described it will be evident that various changes may be made in the construction and arrangement of the parts without departing from the scope of the invention as defined by the following claims.

We claim:

1. A flexible engine mount comprising, an engine support, a plurality of mounting brackets for connecting the engine to said support, each of said brackets including a pedestal housing having its longitudinal axis disposed at an angle to the axis of rotation of the engine, a pedestal core carried by said support having a head adapted for reception in said housing, and resilient pads interposed between confronting surfaces on said housing and head, said bracket having a fixed connection to the engine adjacent said support and a pivotal connection to the engine at a point more remote from said support.

2. A flexible engine mount comprising an engine supporting ring having its center substantially coincident with the axis of rotation of the engine, a plurality of elongated brackets having their longitudinal axes inclined with respect to said axis of rotation and intersecting the latter at a point forward of said ring and intersecting said ring at spaced points about the periphery thereof, each of said brackets comprising a stem pivotally connected to the engine at one end for transmitting loads along the longitudinal axis of the bracket and having an enlargement at its other end constituting a housing, a flexible pedestal having a head receivable in said housing, a stud extended therefrom and carried by said ring, and resilient pads interposed between confronting faces of said housing and head, and a rigid connection between said housing and engine located between said pivotal connection and ring for transmitting radial and torsional loads from said engine to said housing.

3. A bracket for securing an engine to an engine support comprising, a pedestal housing having a fixed support on the engine, a rigid stem on said housing having its longitudinal axis disposed at an angle to the axis of rotation of the engine and having a pivotal connection at its free end with the engine, a pedestal core in said housing, resilient pads interposed between confronting surfaces on said housing and core, and a stud carried by the engine support aligned with said stem and having a threaded connection with said core.

4. A bracket for connecting an engine to an engine support comprising, a pedestal housing having a rigid connection to the engine, a stem rigidly connected with said housing and having its free end pivotally connected to the engine, said housing and stem having a common longitudinal axis which is inclined with respect to the axis of the engine and intersecting the same at a point forward of said support, a pedestal core in said housing including a head centrally located in said housing and pads of resilient material in said housing between confronting faces of said head and housing, and a stud carried by said support in the axis of said housing and stem and having a detachable connection to said core.

5. A bracket for connecting an engine to an engine supporting ring comprising, a pedestal housing having a rigid connection to the engine adjacent said support, a stem rigidly connected with said housing having a pivotal connection with the engine at a point remote from said support, said pedestal housing and stem having a common longitudinal axis inclined with respect to the axis of rotation of the engine and intersecting the latter at a point forward of said ring, a core head disposed in said housing, resilient pads interposed between confronting faces of said head and housing, said ring having a stud receiving passage through its periphery which is aligned with the axis of said housing and stem, and a stud extending through said passage and having a screw-threaded connection with said head.

6. A pedestal type bracket for connecting an engine to an engine mounting ring comprising, a flexible pedestal housing connected to the engine at two points, one of which is a rigid connection to the engine adjacent said ring and the other of which is a pivotal connection to the engine at a point forward of said rigid connection, the axis of said pivot being disposed in a plane parallel with the plane of said ring, and a pedestal carried by said ring having a flexible head disposed within said housing.

7. In an engine mount having a core and a housing flexibly connected by resilient material for relative axial and lateral movements, a pair of frictionally engaged members carried respectively by said core and said housing for relative lateral movement therewith, and means including a spring carried by said housing for maintaining said members in substantially constant frictional engagement with a force which is substantially unaffected by relative movements of said core and housing.

8. A pedestal type bracket for connecting an engine to an engine support including a flexible pedestal housing carried by the engine and having its longitudinal axis inclined with respect to the axis of rotation of the engine, said housing having a fixed connection with said engine adjacent said support and a pivotal connection with said engine at a point more remote from said support, a flexible core receivable in said housing including a core head having surfaces transverse to the axis of said bracket and having resilient pads interposed between said surfaces and confronting surfaces of said housing, said support having a bracket attaching stud extended through a portion thereof in the axis of said bracket and screw-threaded into said core, and cooperating interlocking means on said support and on said core engageable as said bracket is swung about its pivotal connection to the engine into alignment with said stud.

9. In combination, an engine having a crankcase and a blower case, an engine support disposed in a plane normal to the axis of rotation of the engine, a plurality of engine mount brackets for connecting said engine to said support, and means carried by each of said brackets forming two mutually perpendicular surfaces cooperating with two mutually perpendicular surfaces formed on said blower case for respectively transmitting radial and torsional loads between said engine and said brackets, and means forming a third surface on said bracket cooperating with a surface on the crankcase substantially normal to the axis of rotation of the engine for transmitting fore and aft loads between said engine and said brackets.

10. In combination, an engine having a crankcase and a blower case, an engine support disposed in a plane normal to the axis of rotation of the engine, a plurality of engine mount brackets for connecting said engine to said support, each of said brackets having a fixed connection to said engine blower case including confronting faces on said blower case and bracket for transmitting torsional and radial forces from the engine to said brackets and also having a connection to said engine crankcase including confronting faces on said crankcase and bracket disposed normal to said axis of rotation for transmitting fore and aft loads from the engine crankcase to said brackets.

11. Flexible engine mount comprising, an engine carried member, a support carried member, one of said members including a housing and the other a pedestal having a head portion disposed in said housing and a stem extending through an aperture in a wall of said housing and having an elliptical cross-sectional portion in the vicinity of said aperture, resilient pads disposed between confronting faces on said head and housing, said elliptical stem portion being smaller than said aperture and cooperating with the walls of the latter to limit the relative movement between said members, the major axis of said ellipse being in a direction of radial forces exerted by the engine for permitting greater movement of the engine under torsional forces than radial forces.

12. In a mounting system for a radial aircraft engine having a plurality of casing sections, a mount ring, a plurality of mounting brackets connected with said mount ring, each of said mounting brackets including a mushroom-shaped core member attached to said ring and bell-shaped housing member having an elongated strut member extending therefrom, said core and housing members being connected by interposed resilient material, a connection between each of said strut members and one of said casing sections for transmitting fore and aft loads between said engine and said brackets, and a connection between each of said housing members and another of said casing sections for transmitting torsional loads between said engine and said brackets.

JOHN MORELAND TYLER.
ANDREW V. D. WILLGOOS.

REFERENCES CITED

The following references are of record in the file of this patent:

UNITED STATES PATENTS

| Number | Name | Date |
|---|---|---|
| 2,175,999 | Taylor | Oct. 10, 1939 |
| 2,241,139 | Julien et al. | May 6, 1941 |
| 2,241,408 | Lord | May 13, 1941 |
| 2,317,501 | Tyler | Apr. 27, 1943 |
| 2,377,492 | Gorton | June 5, 1945 |
| 2,411,562 | Thompson | Nov. 26, 1946 |